US012347430B2

(12) United States Patent
Carbune et al.

(10) Patent No.: US 12,347,430 B2
(45) Date of Patent: *Jul. 1, 2025

(54) AUTOMATED ASSISTANT ADAPTATION OF A RESPONSE TO AN UTTERANCE AND/OR OF PROCESSING OF THE UTTERANCE, BASED ON DETERMINED INTERACTION MEASURE

(71) Applicant: GOOGLE LLC, Mountain View, CA (US)

(72) Inventors: Victor Carbune, Zurich (CH); Matthew Sharifi, Kilchberg (CH)

(73) Assignee: GOOGLE LLC, Mountain View, CA (US)

( * ) Notice: Subject to any disclaimer, the term of this patent is extended or adjusted under 35 U.S.C. 154(b) by 154 days.

This patent is subject to a terminal disclaimer.

(21) Appl. No.: 17/892,803

(22) Filed: Aug. 22, 2022

(65) Prior Publication Data
US 2022/0392449 A1    Dec. 8, 2022

Related U.S. Application Data

(63) Continuation of application No. 16/947,513, filed on Aug. 4, 2020, now Pat. No. 11,455,996.
(Continued)

(51) Int. Cl.
*G10L 15/22* (2006.01)
*G06F 3/16* (2006.01)
(Continued)

(52) U.S. Cl.
CPC .............. *G10L 15/22* (2013.01); *G06F 3/167* (2013.01); *G06F 16/3344* (2019.01);
(Continued)

(58) Field of Classification Search
USPC ........................................................ 704/275
See application file for complete search history.

(56) References Cited

U.S. PATENT DOCUMENTS 10,192,551 B2    1/2019  Carbune et al.
10,594,757 B1 *  3/2020  Shevchenko ........... G10L 15/22
(Continued)

FOREIGN PATENT DOCUMENTS

WO         2019236372        12/2019

*Primary Examiner* — Seong-Ah A Shin
(74) *Attorney, Agent, or Firm* — Gray Ice Higdon

(57) ABSTRACT

Implementations set forth herein relate to an automated assistant that provides a response for certain user queries based on a level of interaction of the user with respect to the automated assistant. Interaction can be characterized by sensor data, which can be processed using one or more trained machine learning models in order to identify parameters for generating a response. In this way, the response can be limited to preserve computational resources and/or ensure that the response is more readily understood given the amount of interaction exhibited by the user. In some instances, a response that embodies information that is supplemental, to an otherwise suitable response, can be provided when a user is exhibiting a particular level of interaction. In other instances, such supplemental information can be withheld when the user is not exhibiting that particular level of interaction, at least in order to preserve computational resources.

18 Claims, 7 Drawing Sheets

Related U.S. Application Data

(60) Provisional application No. 63/057,099, filed on Jul. 27, 2020.

(51) Int. Cl.
*G06F 16/334* (2025.01)
*G06N 20/00* (2019.01)

(52) U.S. Cl.
CPC ........ *G06N 20/00* (2019.01); *G10L 2015/223* (2013.01); *G10L 2015/225* (2013.01)

(56) References Cited

U.S. PATENT DOCUMENTS

| | | |
|---|---|---|
| 10,706,873 B2 * | 7/2020 | Tsiartas ............... G10L 15/1822 |
| 10,783,876 B1 * | 9/2020 | Hoover ............... G10L 15/1815 |
| 10,937,420 B2 * | 3/2021 | Park ........................ G10L 15/22 |
| 11,016,968 B1 * | 5/2021 | Hoover ................... G10L 15/22 |
| 2002/0097848 A1 * | 7/2002 | Wesemann ........ H04M 3/53308 |
| | | 704/E15.04 |
| 2020/0193264 A1 * | 6/2020 | Zavesky ............... G06N 20/00 |
| 2020/0327895 A1 * | 10/2020 | Gruber .................... G10L 17/22 |
| 2020/0379787 A1 * | 12/2020 | Martin .................. G06F 16/176 |
| 2020/0380980 A1 * | 12/2020 | Shum ...................... G10L 15/18 |
| 2021/0020177 A1 * | 1/2021 | Oh .......................... G10L 15/04 |
| 2021/0043208 A1 * | 2/2021 | Luan ...................... G10L 17/26 |
| 2021/0118450 A1 * | 4/2021 | Gorsica .................. G06F 3/167 |
| 2021/0304756 A1 * | 9/2021 | Iwase ..................... G10L 15/22 |
| 2022/0028379 A1 | 1/2022 | Carbune et al. |

* cited by examiner

AUTOMATED ASSISTANT ADAPTATION OF A RESPONSE TO AN UTTERANCE AND/OR OF PROCESSING OF THE UTTERANCE, BASED ON DETERMINED INTERACTION MEASURE

BACKGROUND

Humans may engage in human-to-computer dialogs with interactive software applications referred to herein as "automated assistants" (also referred to as "digital agents," "chatbots," "interactive personal assistants," "intelligent personal assistants," "conversational agents," etc.). For example, humans (which when they interact with automated assistants may be referred to as "users") may provide commands and/or requests using spoken natural language input (i.e., utterances) which may in some cases be converted into text and then processed, and/or by providing textual (e.g., typed) natural language input.

An automated assistant can be responsive to user queries regarding a variety of different subject matters. For many queries, automated assistant response(s) with the same amount of detail are provided responsive to a plurality of discrete instances of a given query, despite those instances being provided in disparate contexts. For example, for a given query of "which wire is the ground wire" that is provided as a spoken utterance, the same static audibly rendered response can be provided responsive to hundreds of discrete instances of that utterance from hundreds of different users. For instance, the static response can be "the ground wire is typically plain or green and takes electricity back to the breaker panel, then to a rod buried in the ground". This same response can be provided despite, for some instances, corresponding users not having provided a prior utterance to the automated assistant for quite some time (e.g., minutes, hours, or even days before the corresponding utterance)—while for other instances, the corresponding utterance was preceded by one or more corresponding temporally proximate utterances directed to the assistant.

SUMMARY

Implementations set forth herein relate to an automated assistant that modifies certain features of a response to an utterance of a user and/or modifies processing of the utterance, based at least in part on a determined interaction measure (also referred to herein as a level of interaction) that quantifies a degree of interaction between the user and the automated assistant. In some of those implementations, the level of interaction is determined based at least in part on temporal proximity of the utterance to one or more preceding utterances of the user and/or temporal proximity of the preceding utterances relative to one another. Generally, the level of interaction can be determined such that a greater degree of interaction is quantified as the time lapse between queries (optionally subtracting out or otherwise accounting for duration of intervening response(s)) decreases and/or as the quantity of temporally proximate queries increases.

In some implementations that adapt features of a response to a query based on a level of interaction, robustness of the response can be increased as the degree of interaction, that is reflected by the level of interaction, increases. As one example, the response can be adapted to include more content from a given resource (e.g., a lengthier snippet of text from a webpage). For instance, a less robust response can include only a single sentence or a portion of a sentence from a webpage, whereas a more robust response can additionally include additional sentence(s) that precede and/or follow that sentence. As another example, a more robust response can be adapted to include, in addition to content that is responsive to the utterance, additional content from additional resource(s) that are related to the utterance, but not directly responsive to the utterance. For instance, the more robust response can include additional content that is responsive to an additional utterance that, in past interactions of multiple users, is often issued before or after the utterance (e.g., the additional utterance co-occurs more frequently with the utterance than it does with any other utterance). Dynamically adapting robustness of the response can achieve various technical benefits. For example, for lower levels of interaction shortened less robust responses can be generated and, as a result, less network bandwidth will be utilized to transmit such responses and/or less client device resources (e.g., processor, memory, power) will be utilized in rendering such responses. As another example, for higher levels of interaction more robust responses can be generated and, as a result, one or more follow-on utterances of the user can be obviated. This can obviate resource intensive processing of the follow-on utterance(s) and/or can shorten the overall duration of an interaction between the user and the automated assistant. For instance, by including, in a response to an utterance, additional content from an additional resource that is responsive to a related utterance, issuance of the related utterance as follow-on utterance can be obviated. More generally, implementations seek to balance the competing technical benefits from providing more concise responses versus more robust responses (e.g., those based on a likely next utterance)—and do so by generating responses based on a level of interaction of the user to increase the likelihood that the technical benefits are achieved.

In some implementations that adapt processing of an utterance based on a level of interaction, the adapted processing can include automatic speech recognition (ASR) processing and/or voice filtering processing. As one example, as the degree of interaction, that is reflected by the level of interaction, increases, ASR can be biased to a greater extent toward terms that are particular to the user and/or a greater quantity of terms that are particular to the user can be utilized in the ASR biasing. For instance, with a lower level of interaction ASR biasing can be to a first extent and/or for a first set of terms of the user, whereas for a higher level of interaction ASR biasing can be to a greater second extent and/or for a second set of terms (e.g., that includes the first set and additional terms). As another example, voice filtering in favor of the user's voice can be activated when the degree of interaction reaches a threshold (whereas it is not activated before) and/or can be performed to an extent that increases as the degree of interaction increases.

For instance, some voice filtering in favor of the user processes audio data (e.g., a digital representation thereof) and a speaker embedding for the user, using a trained machine learning model, to generate filtered output that is refined audio data that filters out other voice(s) and/or background noise. Put another way, the filtered output seeks to generate refined audio data that includes only utterances from the user that issued the previous queries. The filtered output can be what is processed by ASR. Dynamically adapting processing of the utterance in dependence on the level of interaction can achieve various technical benefits. For example, for lower levels of interaction lesser degrees of (or no) ASR biasing and/or voice filtering can be utilized, thereby enabling effective recognition of voice input from other user(s) that may interact with the same assistant device with which the user is interacting. On the other hand, for higher levels of interaction, higher degrees of ASR biasing and/or voice filtering can be utilized, thereby enabling more effective recognition of voice input from the user that is actively and highly engaged.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described herein. Yet other implementations may include a system of one or more computers that include one or more processors operable to execute stored instructions to perform a method such as one or more of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
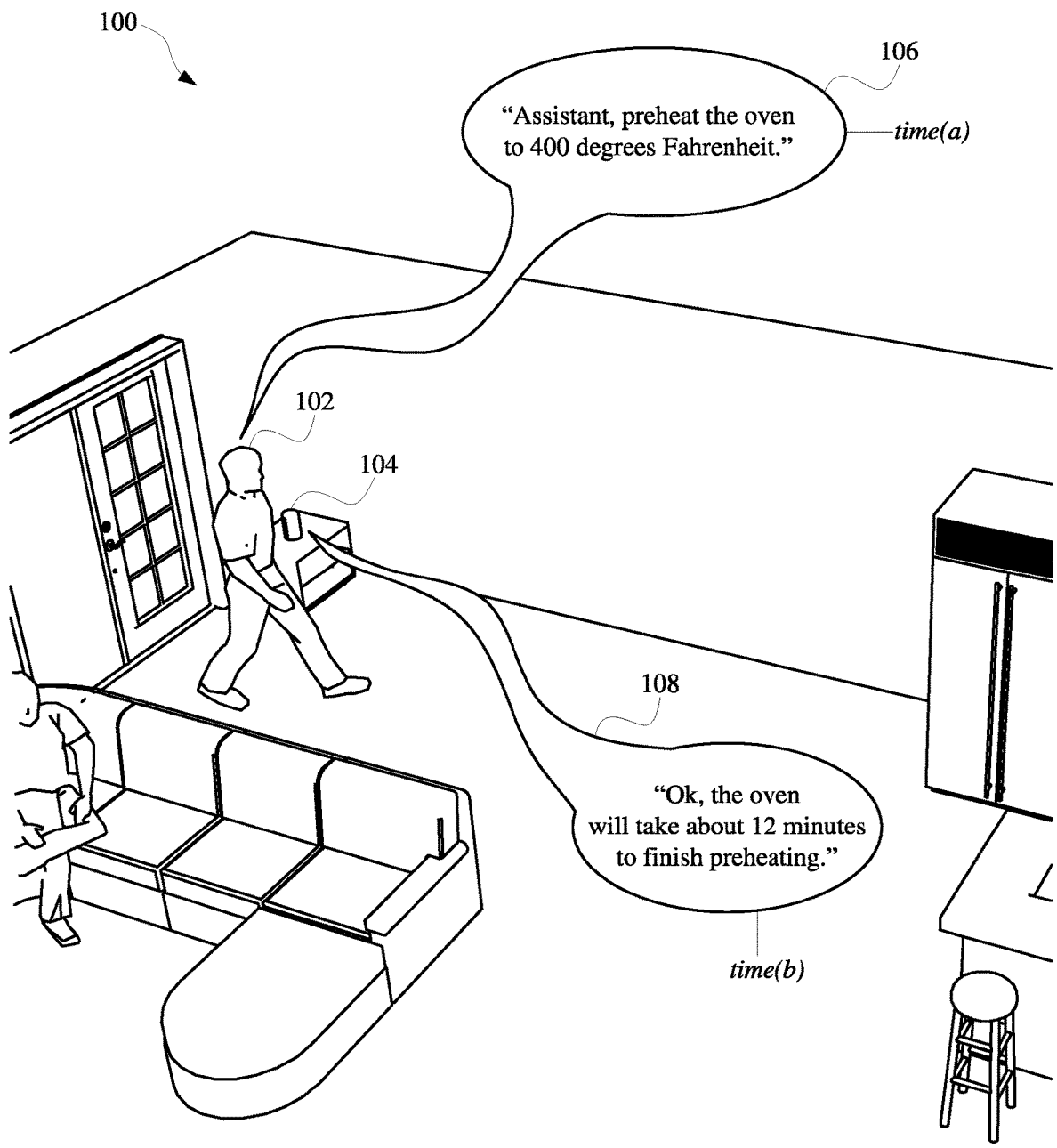
FIG. 1A and FIG. 1B illustrate views of a user interacting with an automated assistant to cause the automated assistant to render an output that is responsive to an initial query from the user and one or more predicted queries.

Implementations set forth herein relate to an automated assistant that modifies certain features of a response according to a detected level of interaction between a user and the automated assistant. In this way, a user that is more engaged with an automated assistant can receive responsive outputs from the automated assistant in a manner that allows content to be more readily understood for particular levels of interaction. Furthermore, this can allow the automated assistant to adapt processing of inputs according to a level of engagement of a user. This can also allow the automated assistant to preserve computational resources that may otherwise be consumed when the automated assistant renders output for a user who is not particularly engaged with the automated assistant. For example, an automated assistant that provides responsive output to a user query—but omits supplemental content thereafter, can preserve computational resources, such as power and processing bandwidth, when such supplemental content involves rendering video output.

For example, a user can invoke their automated assistant upon arriving home from work and heading into their garage in order to check on a charging process of their vehicle. When the user enters their home, the user can provide a spoken utterance to the automated assistant in order to obtain some information prior to entering the garage. The spoken utterance can be, for example, "Assistant, is my car still charging?" When the automated assistant receives the spoken utterance, the automated assistant can determine a level of interaction for the user. In some implementations, the level of interaction can be determined using data that is generated at one or more instances of time ranging from before, during, and/or after the user provided one or more spoken utterances. For example, prior to the user providing the spoken utterance and/or while the user is providing the spoken utterance, the automated assistant can determine that the user is exhibiting a relatively low level of interaction. As a result, certain features (e.g., a total amount of time) of a responsive output from the automated assistant can be modified in order for the automated assistant to render an output that is more discrete (e.g., "Yes."). However, when the user is determined to be exhibiting a relatively high level of interaction (e.g., a level that satisfies a threshold), the features of the responsive output can be modified in order for the automated assistant to render an output that is less discrete and provides supplemental information (e.g., "Yes, and is currently at 67%."). For example, the supplemental information can correspond to responses for one or more predicted queries that may be associated with the query from the user.

In some implementations, as the user continues to provide spoken utterances to the automated assistant, the automated assistant can determine a level of interaction of the user based on an amount of time between the spoken utterances and/or one or more topics embodied in the spoken utterances. For example, a user that provides a series of spoken utterances that have a short temporal proximity between spoken utterances can be considered to have a higher level of interaction than when the user provides the series of spoken utterances with a greater temporal proximity between each spoken utterance. Alternatively, or additionally, a user that provides a series of spoken utterances that embody a common theme or subject can be considered to have a higher level of engagement than a user that provides a different series of spoken utterances in which each spoken utterance has a different theme or subject.

In some implementations, a level of interaction for the user can be determined using data generated from one or more sensors. For example, a location and/or physical orientation of the user can be determined from data generated using a camera, a microphone, and/or any other sensor that can be used to determine a level of interaction of a user. Alternatively, or additionally, certain features captured from one or more sensors, such as vocal characteristics, time between spoken utterances, an amount of motion, whether a user is physically carrying their device, whether a user is holding their device in their hand, gaze, and/or posture of the user before, during, and/or after providing the spoken utterance, can be determined in order to estimate the level of interaction for the user. Furthermore, levels of interaction of a user can be dynamic values that are determined at multiple instances over a range(s) of time. Changes in the level of interaction for one or more users can then be processed as feedback in order for the automated assistant to adapt one or more features of an interaction between the user and the automated assistant according to the feedback.

For example, a user can be seemingly engaged with their portable computing device prior to issuing a spoken utterance to an automated assistant device, which may be located on a shelf in a home of the user. While issuing the command, the level of interaction between the user and the automated assistant may be relatively low (e.g., 60%) because the user may seem to be more engaged with their portable computing device. However, the level of interaction between the automated assistant and the user can satisfy a threshold for providing some amount of supplemental information with a responsive output. For example, the spoken utterance can be, "Assistant, is the dishwasher running?" In response to the spoken utterance, the automated assistant can provide an automated assistant response such as, "No, the dishwasher stopped running at 10:30 AM." This automated assistant response can be responsive to the query from the user as well as one or more predicted queries from the user such as, "When did the dishwasher finish running?" When the automated assistant is providing this response, and/or subsequent to the automated assistant providing this response, the automated assistant can determine that the level of interaction has subsequently increased between the user and the automated assistant (e.g., increased from 60% to 75%). The automated assistant can determine that this subsequent level of interaction is suitable for the automated assistant to continue interacting with the user.

For example, when the automated assistant provides the responsive output, the user can direct their gaze from the portable computing device to the automated assistant device. Additionally, the user may provide a separate spoken utterance to the automated assistant such as, "What is making that noise?" within a temporal proximity of the previous spoken utterance. In response, and based on the increased level of user interaction by the automated assistant, the automated assistant can generate an additional response for the user. For example, the automated assistant can provide responsive output such as, "Currently, there are three appliances operating in the home. Would you like to know more?" In this way, because the user is exhibiting an increased level of interaction in response to the first automated assistant response, the automated assistant can continue the interaction in order to resolve any issues and/or predicted queries from the user.

In some implementations, a type of interaction that is contributing to the level of interaction of a user can be a basis for how the automated assistant responds to the user. For example, as an interaction between the user and the automated assistant continues, the automated assistant can cause content to be rendered via one or more different modalities. For instance, in the aforementioned example, when in response to the user adjusting their gaze and their level of interaction increasing, the automated assistant can cause graphical content to be rendered at the automated assistant device (e.g., a graphical control panel for controlling, and/or indicating a status of, each appliance). Alternatively, when the user adjusts their gaze but their level of interaction decreases, one or more features of the additional response from the automated assistant can be adjusted accordingly. For instance, in the aforementioned example, when the user provides the separate spoken utterance (e.g., "Ok, thank you.")—instead of the automated assistant providing supplemental information, the automated assistant can bypass rendering another output.

Alternatively, or additionally, when the user provides the separate spoken utterance (e.g., "Ok, that's interesting."), the automated assistant can render another output that includes less content and/or fewer modalities to render. For example, instead of rendering an audible output, the automated assistant can render a graphical interface output, such as a selectable link that, when selected, causes the automated assistant to render a status page that provides a detailed list of each appliance in the home and their operating status. In this way, a user exhibiting a lack of interaction with an automated assistant will not be disturbed by the automated assistant until their level of interaction increases. Moreover, the automated assistant can adapt responses according to the types of interactions exhibited by a user in order to ensure that the automated assistant is not rendering outputs to a user that is exhibiting little interaction with the automated assistant. Limiting automated assistant responses in this way can preserve computational resources that may otherwise be wasted on futile attempts to interact with a user who may have little interest in prolonging an interaction with the automated assistant.

In some implementations, features of a responsive output can be adjusted in order to provide less detailed and/or more detailed content based on a level of interaction and/or a change in the level of interaction of the user. Alternatively, or additionally, one or more sources of content can be selected based on a level of interaction and/or a change in the level of interaction. For example, when the level of interaction satisfies a first threshold, the automated assistant can rely on a first application for generating content for the user. However, when the level of interaction satisfies a second threshold, the automated assistant can rely on a second application for generating content for the user. For instance, in order to fulfill a particular query, the automated assistant can access content from a news application when the first threshold is satisfied and a video application when the second threshold is satisfied.

In some implementations, when the user is exhibiting a first level of interaction, the automated assistant can select to render a responsive output that includes details from a subset of content. The content can include other information that was not included in the subset of content, but can be included in subsequent automated assistant responses depending on how a level of interaction(s) of one or more users changes over time. For example, when the user is exhibiting a relatively low level of interaction and the user provides a spoken utterance such as, "When does the game start tonight?", the automated assistant can provide a response such as, "9:30 PM." This information can be accessed by the automated assistant using a browser application and/or a sports application. When the level of interaction of the user increases to a particular threshold, the automated assistant can access other content from the same source and/or a different source and/or identify other predicted queries to fulfill. For example, when the level of interaction increases as a result of the user moving closer to an automated assistant device, the automated assistant can render content such as, "The next scheduled game is Tuesday at 9:30 PM." This additional content can be based on information from the same source, but can incorporate different information that was not used for providing the previous automated assistant response. Furthermore, this additional content can be based on one or more predicted queries (e.g., "What about the next scheduled game?") that the user has not explicitly provided to the automated assistant but the automated assistant has identified based on the initial query and the level of interaction.

Figure 1B:
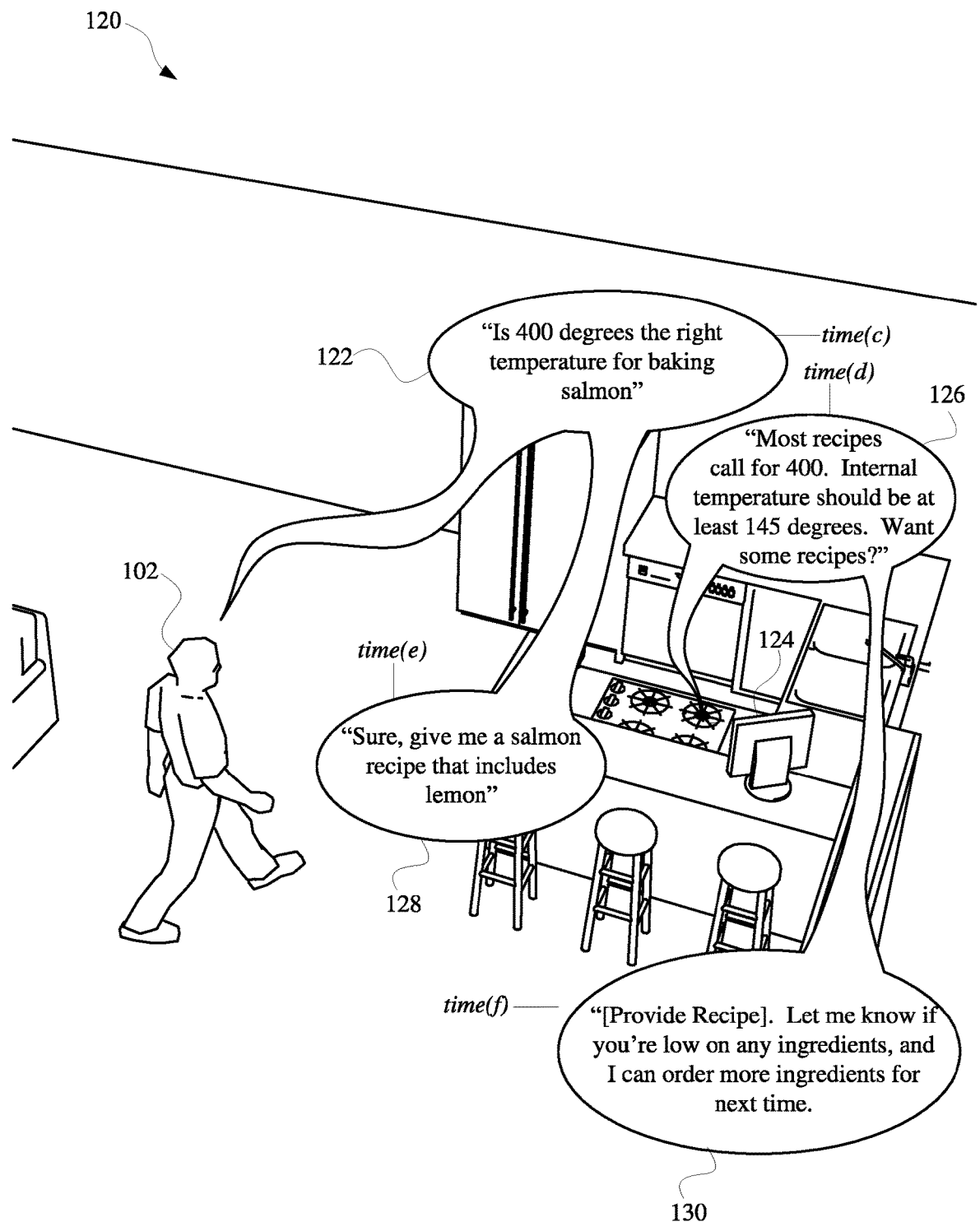

FIG. 1A and FIG. 1B illustrate a view 100 and a view 120 of a user 102 interacting with an automated assistant to cause the automated assistant to render an output that is responsive to an initial spoken utterance 106 from the user 102 and one or more predicted queries. For example, the user 102 can enter their home and provide an initial spoken utterance 106 to an automated assistant device 104. The initial spoken utterance 106 can be, "Assistant, preheat the oven to 400 degrees Fahrenheit." At one or more instances of time before, during, and/or after the user 102 provides the initial spoken utterance 106, an automated assistant that is accessible via the automated assistant device 104 can determine a level of interaction of the user 102. The level of interaction can be based on one or more instances of data generated at the automated assistant device 104 and/or one or more other computing devices. In some implementations, the level of interaction can be at least partially based on content of one or more queries provided by the user 102. For example, because preheating an oven can be relatively dangerous, the user 102 can be determined to have a relatively high level of interaction, and/or a level of interaction that satisfies a particular interaction threshold when providing user queries directed to controlling an oven.

In response to receiving the initial spoken utterance 106, and based on the determined level of interaction for the user 102, the automated assistant can render a response from an audio interface of the automated assistant device 104. A responsive output 108 from the automated assistant can be, for example, "Okay, the oven will take about 12 minutes to finish preheating." In order to generate this responsive output 108, the automated assistant can communicate with a smart oven that is in communication with the automated assistant device 104.

In some implementations, the automated assistant can rely, at least in part, on temporal proximity of spoken utterances from one or more users in determining a level of interaction of the one or more users, and/or select responsive output features according to the level of interaction. For example, as illustrated in FIG. 1A, the user 102 can provide the initial spoken utterance 106 at a time(a). The user 102 can, thereafter, provide an additional spoken utterance 122 at a time(c), as illustrated in FIG. 1B. The user 102 can provide another spoken utterance 128 at time(e) in the series of spoken utterances from the user 102. In order to determine a level of engagement of the user 102, the automated assistant can determine a time between the initial spoken utterance 106 and the additional spoken utterance 122, the additional spoken utterance 122 and the other spoken utterance 128, and/or the initial spoken utterance 106 and the other spoken utterance 128.

For example, the automated assistant, or another application or apparatus, can determine an elapsed time between the user 102 providing the initial spoken utterance 106 and the user 102 providing the additional spoken utterance 122. The determined elapsed time can be processed in order to generate a level of interaction, between the user 102 and the automated assistant, for the spoken utterance 122. In some implementations, the elapsed time between two or more spoken utterances can be directly proportional to the level of interaction for a user. In some implementations, a level of interaction between the automated assistant and the user 102 can be determined from the times corresponding to the two or more spoken utterances and a total amount of time for one or more automated assistant outputs. For example, the automated assistant can provide a responsive output 108 at time(b), which can be between time (a) and time(c). A duration of the responsive output 108 can be subtracted from the time that elapsed between time (a) and time (c), in order to identify a reduced elapsed time that can be used to determine a level of interaction of the user 102. In this way, when the reduced elapsed time is "x", the user 102 can be considered to be exhibiting a first level of interaction, but when the reduced elapsed time is "y," which is greater than "x," the user 102 can be exhibiting a second level of interaction that is greater than the first level of interaction.

In some implementations, the automated assistant can determine that the user 102 has an interaction level that has stayed the same or has increased subsequent to the initial spoken utterance 106 (i.e., a first user query) and/or during rendering of the responsive output 108. This determination can be based on one or more instances of data generated at one or more different devices (e.g., one or more devices that include one or more sensors). Alternatively, or additionally, this determination can be based on an additional spoken utterance 122 provided by the user 102, to the automated assistant, as provided in view 120 of FIG. 1B. For example, subsequent to the user 102 providing the initial spoken utterance 106, the user 102 can provide an additional spoken utterance 122 such as "Is 400 degrees the right temperature for baking Salmon?".

Based at least in part on a relatively close temporal proximity between spoken utterance 106 and additional spoken utterance 122 (optionally accounting for a duration of rendering of responsive output 108), the automated assistant can determine a high level of interaction. Based on the high level of interaction, the automated assistant can provide an additional responsive output 126 at another automated assistant device 124. The additional responsive output 126 includes a portion ("Most recipes call for 400.") that is responsive to the additional spoken utterance 122, as well as a first additional portion ("Internal temperature should be at least 145 degrees.") that is responsive to a first predicted query (e.g., "What's a safe internal temperature for salmon?") as well as a second additional portion ("Want some recipes?") that suggests a second predicted query (e.g., "Salmon recipes."). The first and/or second predicted query can be determined based on, for example, co-occurring at a high frequency with additional spoken utterance 122 (and/or variations thereof), relative to frequency of occurrence of other queries, and optionally taking into account (e.g., normalizing based on) overall frequency of the first and/or second predicted query. Put another way, the first and second predicted query can be provided based on co-occurring at a high frequency with additional spoken utterance 122 (and/or variations thereof), relative to their overall frequency of co-occurrence. It is noted that, had spoken utterance 122 not been preceded in close temporal proximity by spoken utterance 106 and/or any other utterance, then a lower level of interaction would be determined. As a result of the lower level of interaction, the responsive output may not include any responsive output from any additional predicted queries and/or may not include any suggested predicted queries. For example, the responsive output in such a situation may include only "Most recipes call for 400".

The user can provide the further spoken utterance 128 of "Sure, give me a salmon recipe that includes lemon" in response to the additional responsive output 126. The automated assistant can again determine a high level of interaction based at least in part on a relatively close temporal proximity between additional spoken utterance 122 and further spoken utterance 128, between spoken utterance 106 and additional spoken utterance 122, and/or between spoken utterance 106 and further spoken utterance 128 (optionally accounting for a duration of rendering of responsive output 108 and/or of additional responsive output 126). Based on the high level of interaction, the automated assistant can provide a further responsive output 130 at the automated assistant device 124. The further responsive output 130 includes a portion, indicated by "[Provide Recipe]" in which a salmon recipe with lemon is provided, as well as an additional portion ("Let me know if you're low on any ingredients, and I can order more ingredients for next time") that suggests a further predicted query (e.g., "Order more [X]", where X is an identifier of ingredients generally). The further predicted query can be determined based on, for example, queries of the form "Order more [X]" (e.g., "order more capers", "order more lemons", etc.) co-occurring at a high frequency with further spoken utterance 128 (and/or variations thereof), relative to frequency of occurrence of other queries, and optionally taking into account (e.g., normalizing based on) overall frequency of the further predicted query. It is noted that, had further spoken utterance 128 not been preceded in close temporal proximity by additional spoken utterance 122, spoken utterance 106 and/or any other utterance, then a lower level of interaction would be determined. As a result of the lower level of interaction, the responsive output may not include any suggested predicted queries. For example, the responsive output in such a situation may include only the salmon recipe that includes lemons.

By identifying the one or more predicted queries as described with respect to FIG. 1B, the automated assistant can generate natural language content corresponding to one or more suitable responses to the one or more predicted queries. In this way, because the user 102 is exhibiting a particular level of interaction at this particular time, the automated assistant can use this time to provide additional information to the user 102, without requiring the user 102 to explicitly request this additional information. This can shorten interactions between the automated assistant and the user of 102, which can preserve computational resources at one or more devices.

In some implementations, when the user 102 is determined to be exhibiting a decrease in their level of interaction, the automated assistant can cease providing additional output until the level of interaction increases or otherwise satisfies a particular interaction threshold. For example, if the user had provided a separate spoken utterance such as, "Ok," in response to the responsive output 108, the automated assistant can determine that this separate spoken utterance corresponds to a decrease in the level of interaction at the user 102. In such instances, the automated assistant can limit output from certain modalities and/or provide output from other modalities. For example, instead of providing the additional responsive output 126 through an audio interface, the automated assistant can cause a similar responsive output to be rendered at a graphical interface of the other automated assistant device 124. Alternatively, or additionally, the automated assistant can cause the other automated assistant device 124 to render natural language content that is responsive to one or more predicted queries—without necessitating that the user 102 explicitly selects the one or more predicted queries to be answered by the automated assistant. This can preserve computational resources that may otherwise be consumed when interactions between a user and an automated assistant are prolonged.

In some implementations, a level of interaction of the user 102 can be determined based on whether the same or similar topics are identified in spoken utterances and/or whether the spoken utterances have a particular temporal proximity to one another. For example, the automated assistant can determine that the initial spoken utterance 106, additional spoken utterance 122, and the other spoken utterance 128 include a common or related topic such as "cooking." Such a determination can be based on, but is not limited to, a comparison of embeddings, corresponding to each spoken utterance, in latent space. For instance, a distance in latent space between each embedding can be determined in order to estimate a similarity score for two or more spoken utterances. Alternatively, or additionally, a similarity score for spoken utterances can be determined based on semantic similarities of each spoken utterance. When the automated assistant determines that user 102 has provided two or more spoken utterances that relate to a common topic or otherwise exhibit a similarity score that satisfies a particular threshold, the automated assistant can assign a level of interaction to the user 102. The level of interaction assigned to the user 102 may or may not satisfy a level of interaction threshold, however, the automated assistant can nonetheless process input(s) from the user 102, and/or provide output to the user 102, based on the determined level of interaction.

In some implementations, the same or similar topics in two or more spoken utterances, along with temporal proximity of the two or more spoken utterances can be used as factors for determining a level of interaction of the user 102. For example, when two or more spoken utterances are determined to embody the same or similar topics, and when the two or more spoken utterances are within a temporal proximity, the user 102 can be considered to have a first level of interaction. However, when two or more spoken utterance from the user 102 are determined to not have the same or similar topics, but the two or more spoken utterances are within the temporal proximity, the user 102 can be optionally considered to have a second level of interaction that is less than the first level of interaction. For example, when a user provides a first spoken utterance about "wiring" and a second spoken utterance about "weather" within a temporal proximity, the user can be considered to have a first level of interaction. However, when the user provides two spoken utterances about "wiring" within that temporal proximity, the user can be considered to have a second level of interaction that is greater than the first level of interaction.

Processing of one or more inputs to the automated assistant, and/or one or more outputs from the automated assistant or another application, can be adapted according to the determined level of interaction. For example, automatic speech recognition (ASR) can be biased toward one or more words that are frequently used by the user 102, based on the level of interaction satisfying a level of interaction threshold. Alternatively, or additionally, one or more features of an output of the automated assistant can be selected based on the level of interaction of the user 102.

In some implementations, a level of interaction can be greater for multiple spoken utterances that have less temporal proximity. For example, a series of x spoken utterances that are ally seconds apart can indicate a greater level of interaction than a series of j spoken utterances that are all k seconds apart, when x=j and both x and j are greater than or equal to 2, and when k is greater than y (where x, y, j, and k are positive integers). Alternatively, or additionally, in some implementations, a level of interaction can be proportional to a quantity of consecutive interactions that satisfy a temporal proximity threshold. For example, a series of x spoken utterances that are all y seconds apart can indicate a greater level of interaction than a series of j spoken utterances that are all k seconds apart, when x>j and both x and j are greater than or equal to 2, and when k and y both satisfy a temporal proximity threshold (where x, y, j, and k are positive integers).

Figure 2A:
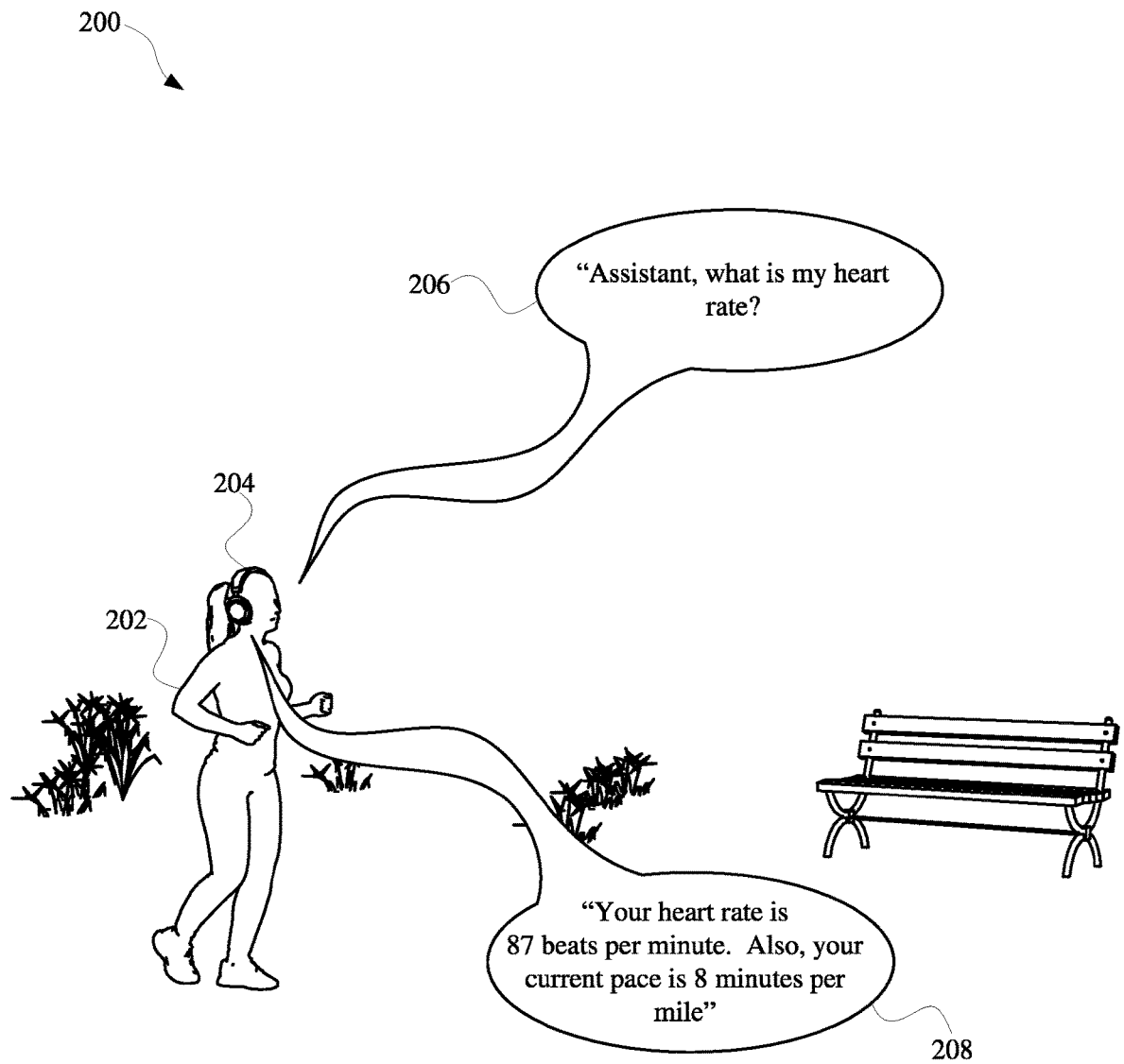
FIG. 2A and FIG. 2B illustrate views of a user providing a query in different contexts, and the query resulting in varying lengths of automated assistant responses based on levels of interaction of the user.
Figure 2B:
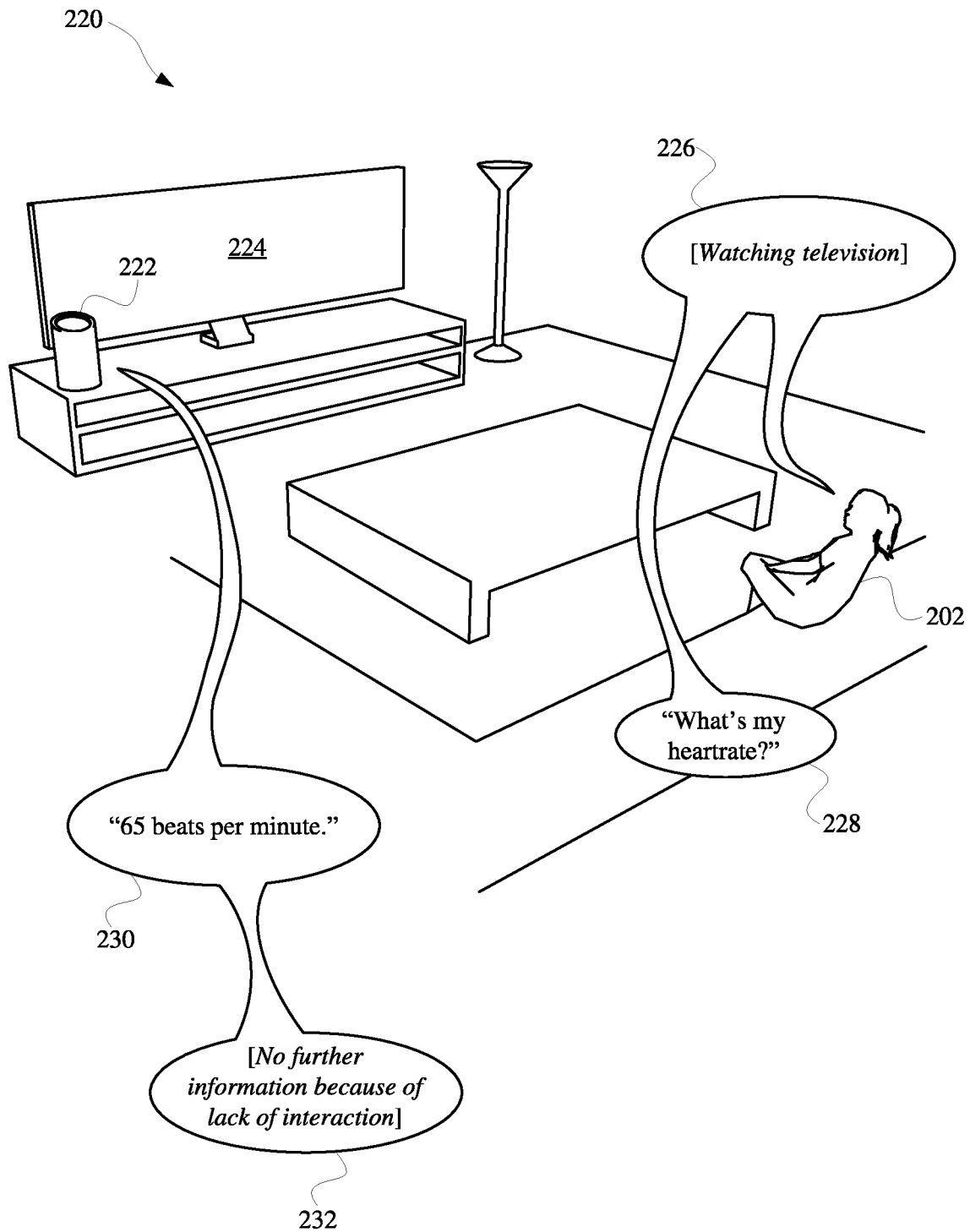

FIG. 2A and FIG. 2B illustrate a view 200 and a view 220 of a user 202 providing a query in different contexts, and that query resulting in varying lengths of automated assistant responses based on varying levels of interaction of the user 202. Furthermore, these automated assistant responses can include varying types of content according to a level of interaction of the user 202. For example, the user 202 can be jogging outside while using a wearable device 204, such as a pair of headphones that provide access to the automated assistant. While jogging, the user can exhibit varying levels of interaction with the automated assistant. For example, a user that is listening to music via the wearable device 204 may be considered less engaged with the automated assistant then another user that is not listening to any audio while jogging and wearing the wearable device 204. The user 202 may not be listening to any audio when the user 202 provides a spoken utterance such as, "Assistant, what is my heart rate?" Because the automated assistant can be determining levels of interaction of the user 202 over time, and with prior permission from the user, the automated assistant can detect an increase in the level of interaction in response to the spoken utterance 206.

When the automated assistant determines that the level of interaction for the user 202 has increased and/or otherwise satisfies a particular threshold, the automated assistant can generate responsive data. The responsive data can include content that is responsive to the spoken utterance 206 from the user 202, as well as one or more other queries that the user 202 may provide to the automated assistant. In some implementations, the one or more other queries, and/or the content that is responsive to those queries, can be identified based on content of the spoken utterance 206 and/or contextual data associated with the spoken utterance 206. For example, data from one or more wearable devices of the user 202 can be processed to determine a context of the user and/or one or more activities being performed by the user, with prior permission from the user. Alternatively, or additionally, the automated assistant can compare the content of the spoken utterance 206 to one or more other spoken utterances provided by the user 202 and/or one or more other users, in order to identify similar queries and/or similar content. Based on this processing, the automated assistant can identify content such as a jogging pace of the user and/or other health parameters of the user, which can be incorporated into other responsive outputs from the automated assistant and/or used to determine a level of interaction of the user.

Based on the context and other data processed by the automated assistant, the automated assistant can generate a responsive output 208 such as, "Your heart rate is 87 beats per minute. Also, your current pace is 8 minutes per mile." In this way, the user 202 can bypass providing subsequent spoken utterances inquiring about this data, and the automated assistant can bypass processing such subsequent utterances. This can preserve computational resources, such as battery life and network bandwidth, which might otherwise be consumed when a wearable device 204 processes spoken inputs.

When a context of the user 202 changes, as depicted in view 220 of FIG. 2B, the user can provide a similar spoken utterance but can receive a more condensed response from the automated assistant. For example, the user 202 can be watching television 224 as indicated by status 226. While the user 202 is watching television 224, the user 202 can provide a spoken utterance 228 to an assistant device 222. The spoken utterance 228 can be, for example, "What's my heart rate?", which can be similar to the spoken utterance 206 provided by the user 202 in FIG. 2A.

A level of interaction of the user 202 can be determined by the automated assistant, with prior permission from the user, at one or more instances of time with a period ranging from before, during, and/or after the user 202 provided the spoken utterance 228. The automated assistant can determine that because the user 202 is watching television 224, the level of interaction of the user is relatively low. Alternatively, or additionally, the automated assistant can determine that the level of interaction of the user 202 with the automated assistant does not satisfy a particular interaction threshold. In some implementations, the level of interaction can be based on a gaze of the user 202, posture of the user 202, content being observed by the user 202, content not being observed by the user 202, the proximity of the user 202 to one or more devices, one or more physiological features of the user 202, and/or any other information that can be suitable for determining a level of interaction of a user with an automated assistant.

Based on the determined level of interaction of the user 202, the automated assistant can provide a responsive output 230, which can include natural language content such as, "65 beats per minute." However, further based on the level of interaction of the user 202, the automated assistant can omit providing further information, as indicated by status 232. For example, the level of interaction of the user 202 can fail to satisfy an interaction threshold that, when satisfied, would otherwise cause the automated assistant to provide further information in response to the spoken utterance 228. This additional information can be identified based on the spoken utterance 228 and/or one or more other queries determined to be associated with the spoken utterance 228. For example, when the interaction threshold is satisfied, the automated assistant can identify responsive information that would satisfy other queries that are related to the query embodied in the spoken utterance 228. However, because the level of interaction of the user 202 did not satisfy a particular threshold (before, during, and/or after providing the spoken utterance 228) the automated assistant can bypass identifying and/or generating such additional information for providing to the user 202.

Figure 3:
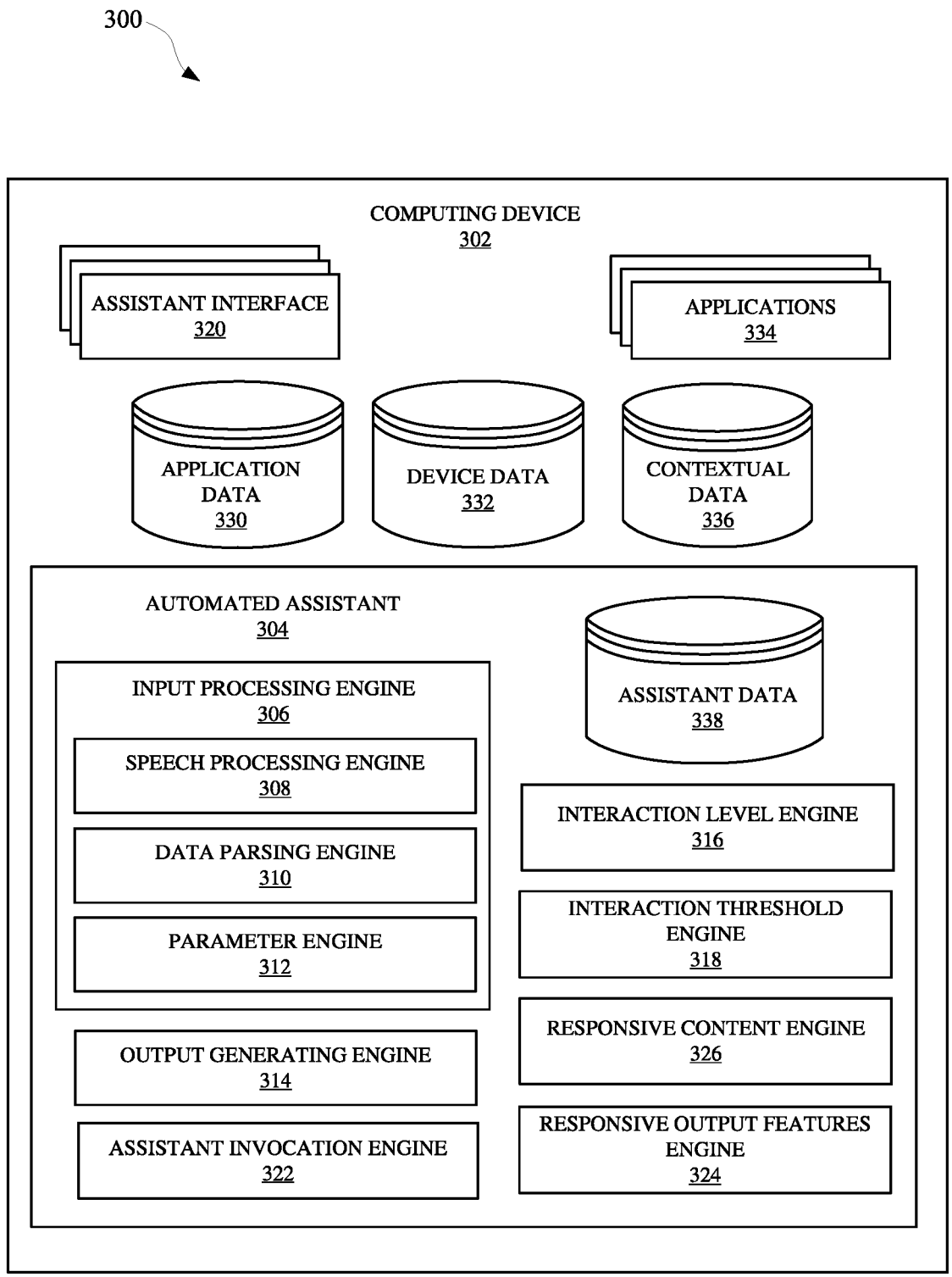
FIG. 3 illustrates a system that includes an automated assistant for providing a response to certain user queries based on a level of interaction of the user with respect to the automated assistant.

FIG. 3 illustrates a system 300 that includes an automated assistant for providing a response to certain user queries based on a level of interaction of the user with respect to the automated assistant. The automated assistant 304 can operate as part of an assistant application that is provided at one or more computing devices, such as a computing device 302 and/or a server device. A user can interact with the automated assistant 304 via assistant interface(s) 320, which can be a microphone, a camera, a touch screen display, one or more user interfaces, and/or any other apparatus capable of providing an interface between a user and an application. For instance, a user can initialize the automated assistant 304 by providing a verbal, textual, and/or a graphical input to an assistant interface 320 to cause the automated assistant 304 to initialize one or more actions (e.g., provide data, control a peripheral device, access an agent, generate an input and/or an output, etc.). Alternatively, the automated assistant 304 can be initialized based on processing of contextual data 336 using one or more trained machine learning models. The contextual data 336 can characterize one or more features of an environment in which the automated assistant 304 is accessible, and/or one or more features of a user that is predicted to be intending to interact with the automated assistant 304. The computing device 302 can include a display device, which can be a display panel that includes a touch interface for receiving touch inputs and/or gestures for allowing a user to control applications 334 of the computing device 302 via the touch interface. In some implementations, the computing device 302 can lack a display device, thereby providing an audible user interface output, without providing a graphical user interface output. Furthermore, the computing device 302 can provide a user interface, such as a microphone, for receiving spoken natural language inputs from a user. In some implementations, the computing device 302 can include a touch interface and can be void of a camera, but can optionally include one or more other sensors.

The computing device 302 and/or other third party client devices can be in communication with a server device over a network, such as the internet. Additionally, the computing device 302 and any other computing devices can be in communication with each other over a local area network (LAN), such as Wi-Fi network. The computing device 302 can offload computational tasks to the server device in order to conserve computational resources at the computing device 302. For instance, the server device can host the automated assistant 304, and/or computing device 302 can transmit inputs received at one or more assistant interfaces 320 to the server device. However, in some implementations, the automated assistant 304 can be hosted at the computing device 302, and various processes that can be associated with automated assistant operations can be performed at the computing device 302.

In various implementations, all or less than all aspects of the automated assistant 304 can be implemented on the computing device 302. In some of those implementations, aspects of the automated assistant 304 are implemented via the computing device 302 and can interface with a server device, which can implement other aspects of the automated assistant 304. The server device can optionally serve a plurality of users and their associated assistant applications via multiple threads. In implementations where all or less than all aspects of the automated assistant 304 are implemented via computing device 302, the automated assistant 304 can be an application that is separate from an operating system of the computing device 302 (e.g., installed "on top" of the operating system)—or can alternatively be implemented directly by the operating system of the computing device 302 (e.g., considered an application of, but integral with, the operating system).

In some implementations, the automated assistant 304 can include an input processing engine 306, which can employ multiple different modules for processing inputs and/or outputs for the computing device 302 and/or a server device. For instance, the input processing engine 306 can include a speech processing engine 308, which can process audio data received at an assistant interface 320 to identify the text embodied in the audio data. The audio data can be transmitted from, for example, the computing device 302 to the server device in order to preserve computational resources at the computing device 302. Additionally, or alternatively, the audio data can be exclusively processed at the computing device 302.

The process for converting the audio data to text can include a speech recognition algorithm, which can employ neural networks, and/or statistical models for identifying groups of audio data corresponding to words or phrases. The text converted from the audio data can be parsed by a data parsing engine 310 and made available to the automated assistant 304 as textual data that can be used to generate and/or identify command phrase(s), intent(s), action(s), slot value(s), and/or any other content specified by the user. In some implementations, output data provided by the data parsing engine 310 can be provided to a parameter engine 312 to determine whether the user provided an input that corresponds to a particular intent, action, and/or routine capable of being performed by the automated assistant 304 and/or an application or agent that is capable of being accessed via the automated assistant 304. For example, assistant data 338 can be stored at the server device and/or the computing device 302, and can include data that defines one or more actions capable of being performed by the automated assistant 304, as well as parameters necessary to perform the actions. The parameter engine 312 can generate one or more parameters for an intent, action, and/or slot value, and provide the one or more parameters to an output generating engine 314. The output generating engine 314 can use the one or more parameters to communicate with an assistant interface 320 for providing an output to a user, and/or communicate with one or more applications 334 for providing an output to one or more applications 334.

In some implementations, the automated assistant 304 can be an application that can be installed "on-top of" an operating system of the computing device 302 and/or can itself form part of (or the entirety of) the operating system of the computing device 302. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 302. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 302 can include one or more applications 334 which can be provided by a third-party entity that is different from an entity that provided the computing device 302 and/or the automated assistant 304. An application state engine of the automated assistant 304 and/or the computing device 302 can access application data 330 to determine one or more actions capable of being performed by one or more applications 334, as well as a state of each application of the one or more applications 334 and/or a state of a respective device that is associated with the computing device 302. A device state engine of the automated assistant 304 and/or the computing device 302 can access device data 332 to determine one or more actions capable of being performed by the computing device 302 and/or one or more devices that are associated with the computing device 302. Furthermore, the application data 330 and/or any other data (e.g., device data 332) can be accessed by the automated assistant 304 to generate contextual data 336, which can characterize a context in which a particular application 334 and/or device is executing, and/or a context in which a particular user is accessing the computing device 302, accessing an application 334, and/or any other device or module.

While one or more applications 334 are executing at the computing device 302, the device data 332 can characterize a current operating state of each application 334 executing at the computing device 302. Furthermore, the application data 330 can characterize one or more features of an executing application 334, such as content of one or more graphical user interfaces being rendered at the direction of one or more applications 334. Alternatively, or additionally, the application data 330 can characterize an action schema, which can be updated by a respective application and/or by the automated assistant 304, based on a current operating status of the respective application. Alternatively, or additionally, one or more action schemas for one or more applications 334 can remain static, but can be accessed by the application state engine in order to determine a suitable action to initialize via the automated assistant 304.

The computing device 302 can further include an assistant invocation engine 322 that can use one or more trained machine learning models to process application data 330, device data 332, contextual data 336, and/or any other data that is accessible to the computing device 302. The assistant invocation engine 322 can process this data in order to determine whether or not to wait for a user to explicitly speak an invocation phrase to invoke the automated assistant 304, or consider certain data to be indicative of an intent by the user to invoke the automated assistant—in lieu of requiring the user to explicitly speak the invocation phrase. For example, the one or more trained machine learning models can be trained using instances of training data that are based on scenarios in which the user is in an environment where multiple devices and/or applications are exhibiting various operating states. The instances of training data can be generated in order to capture training data that characterizes contexts in which the user invokes the automated assistant and other contexts in which the user does not invoke the automated assistant. When the one or more trained machine learning models are trained according to these instances of training data, the assistant invocation engine 322 can cause the automated assistant 304 to detect, or limit detecting, spoken invocation phrases from a user based on features of a context and/or an environment. Additionally, or alternatively, the assistant invocation engine 322 can cause the automated assistant 304 to detect, or limit detecting for one or more assistant commands from a user based on features of a context and/or an environment. In some implementations, the assistant invocation engine 322 can be disabled or limited based on the computing device 302 detecting an assistant suppressing output from another computing device. In this way, when the computing device 302 is detecting an assistant suppressing output, the automated assistant 304 will not be invoked based on contextual data 336—which would otherwise cause the automated assistant 304 to be invoked if the assistant suppressing output was not being detected.

The system 300 can further include an interaction level engine 316 that can determine a level of interaction and/or a change in level of interaction of one or more users. A level of interaction can be, but is not limited to, a metric that characterizes an estimated amount of attention that a particular user is giving to the automated assistant 304. Multiple levels of interaction can be determined simultaneously for multiple persons, with prior permission from those persons. For instance, a home that includes multiple users can have varying levels of interaction with an automated assistant that is operating within their home. In some implementations, and with prior permission from users, the interaction level engine 316 can access the application data 330, device data 332, and/or contextual data 336 in order to determine a level of interaction of a user. For example, a user that is interacting with an internet browser while sitting in their home can be considered to have a higher level of interaction than another user that is chatting with a guest of the home and/or eating a meal.

The system 300 can optionally include an interaction threshold engine 318 that establishes one or more interaction level thresholds for one or more respective users, and/or determines whether a particular level of interaction satisfies an interaction threshold. For example, an interaction threshold can be established using one or more trained machine learning models, which can be used to process data characterizing certain user interactions. Processing of the data can result in certain thresholds being identified for characterizing certain degrees of attention that a user may be giving to an automated assistant. The interaction threshold engine 318 can determine whether a particular interaction threshold has been satisfied by an interaction level determined by the interaction level engine 316. When an interaction threshold has been satisfied, the interaction threshold engine 318 can cause a responsive content engine 326 to generate content for the automated assistant 304 to render for a user.

In some implementations, the responsive content engine 326 can use content of a response that has been, or will be provided, to a user. For example, the automated assistant 304 can identify a first portion of content of a web page to provide as a basis for a first responsive output from the automated assistant 304. When the level of interaction for the user continues to satisfy an interaction threshold and/or satisfies another interaction threshold subsequent to the automated assistant providing the first responsive output, the responsive content engine 326 can identify second content. For example, the second content identified by the automated assistant 304 can be selected according to whether the second content is responsive to one or more queries that the user is predicted to provide to the automated assistant 304 and/or is related to a recent input from the user. In some instances, the second content can be identified at a different portion of the same web page, document (e.g., a first document), and/or other corpus of content as the first content. Alternatively, or additionally, the second content can be identified from one or more different documents (e.g., a second document) that are associated with the first content and/or one or more previous queries provided to the automated assistant 304.

In some implementations, content selected for a particular responsive output can be selected based on a user profile associated with a particular user. Alternatively, or additionally, one or more processes for determining a level of interaction of a user can be selected based on the user profile. For example, one or more particular trained machine learning models can be associated with a first user profile that is stored in association with the automated assistant 304. The one or more particular trained machine learning models can be trained using data associated with a first user, and can be used when processing certain data to determine whether a level of interaction of the first user satisfies a particular threshold. One or more other particular trained machine learning models can be associated with a second user profile that is stored in association with the automated assistant 304. The one or more other particular trained machine learning models can be trained using other data associated with a second user that is different from the first user, and can be used when processing certain other data to determine whether a level of interaction of the second user satisfies another particular threshold.

In some implementations, the system 300 can optionally include a responsive output feature engine 324. The responsive output feature engine 324 can select one or more features of an automated assistant response according to the level of interaction of a user that is to receive the automated assistant response. For example, a feature of an automated assistant response can include a length of time for an automated assistant response, and the length of time can be selected based on the level of interaction. For instance, the length of time can be directly proportional or indirectly proportional to a level of interaction of one or more users. Alternatively, or additionally, a volume of an automated assistant response, graphical content of an automated assistant response, pace of an automated assistant response, modality of an automated assistant response, graphical user interface content of an automated assistant response, voice for an automated assistant response, time between words and/or syllables in an automated assistant response, tense of phrases in the automated assistant response, and/or any other feature of an automated assistant response that is adjustable can be modifiable by the automated assistant 304 according to: level of interaction, whether one or more level of interaction thresholds have been satisfied, and/or whether a user profile indicates whether one or more features should be adjusted.

In some implementations, one or more features of an output and/or input provided by a computing device can be modified according to a level of interaction and/or a change in a level of interaction of one or more users. Such features can include an amount of automatic speech recognition (ASR) biasing and/or an amount of voice filtering that is performed by one or more devices. For example, an amount of ASR biasing can be performed according to a user whose level of interaction has changed and/or otherwise satisfies an interaction threshold. When the level of interaction of a particular user satisfies a particular threshold, the automated assistant can bias an ASR process toward a vocabulary of that particular user. For example, certain words may be more frequently by one user compared to another user, and therefore, ASR can bias towards words of a particular user, when that particular user is exhibiting a particular level of interaction or change in a level of interaction.

Alternatively, or additionally, in some implementations, when a particular user is exhibiting a particular level of interaction, the automated assistant can cause voice filtering to bias toward the particular user who is exhibiting the particular level of interaction. For example, although various sensors can be used to determine a level of interaction (with prior permission from one or more users), audio input at the microphone can be filtered according to which user is exhibiting the level of interaction. When a user is exhibiting a particular level of interaction without having provided a spoken utterance, the automated assistant can, regardless, select and/or adapt a voice filter to employ for filtering any forthcoming spoken utterances from the user. Alternatively, or additionally when a user is exhibiting a particular level of interaction, the automated assistant can select an image filter for filtering any forthcoming gestures and/or other visual inputs that can be provided to the automated assistant. For example, audio captured by an automated assistant device can be filtered using a voice filter that is biased for a user who is exhibiting a highest level of interaction relative to other persons that may be within a proximity of the automated assistant device. Furthermore, as a level of interaction of a first user decreases with respect to an automated assistant, and another level of interaction of a second user increases, a different voice filter that is biased for the second user can be selected. The voice filter can then be used to filter out other noise and/or voices that do not correspond to a voice of the user who is exhibiting a highest level of interaction.

Figure 4:
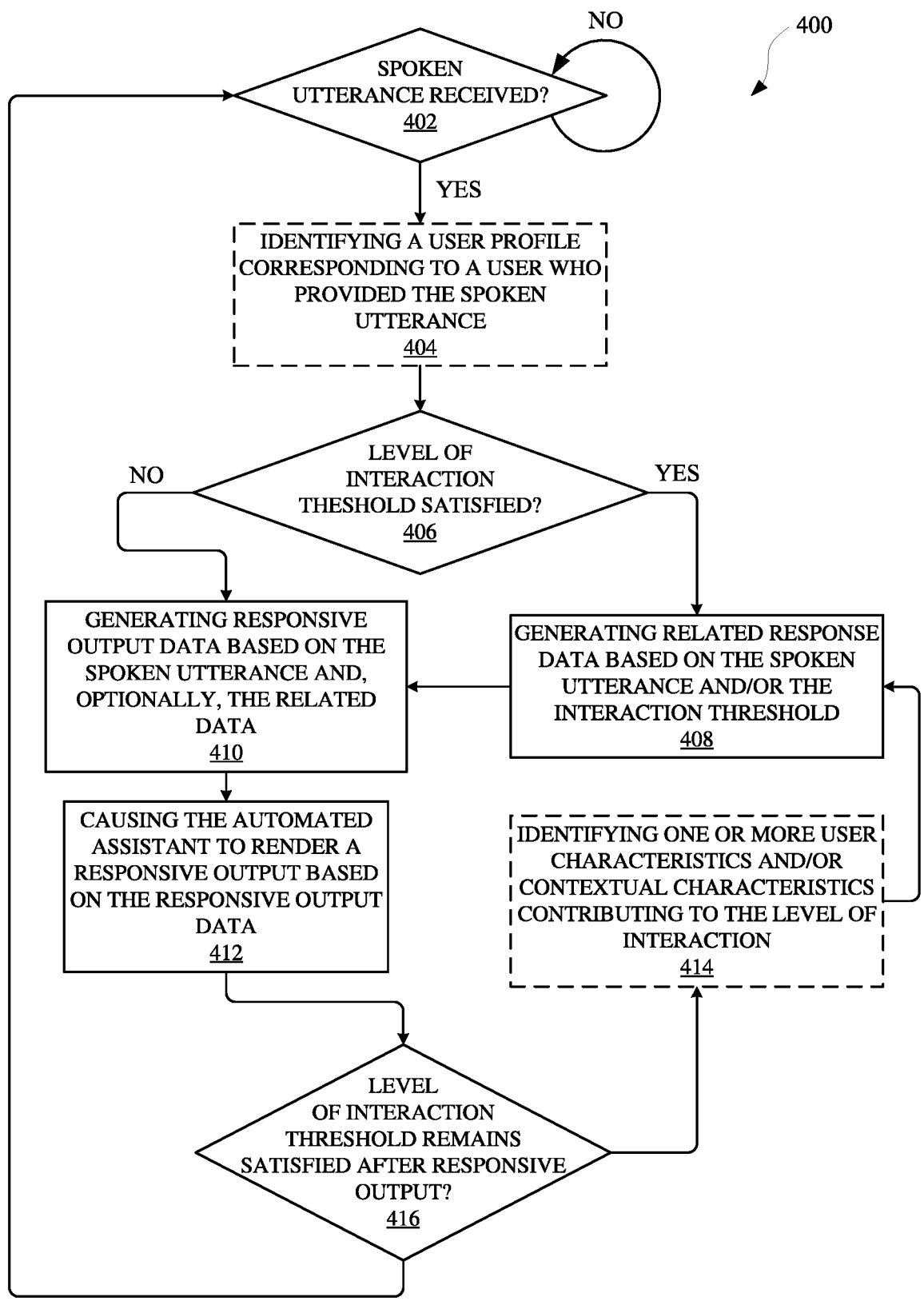
FIG. 4 illustrates a method for proactively providing automated resistant responses according to user interaction, without necessitating explicit user input to the automated assistant as an interaction between a user and the automated assistant continues.

FIG. 4 illustrates a method 400 for proactively providing automated resistant responses according to user interaction, without necessitating explicit user input to the automated assistant as an interaction between a user and the automated assistant continues. The method 400 can be performed by one or more applications, devices, and/or any other apparatus or module capable of interacting with a user and/or an automated assistant. The method 400 can include an operation 402 of determining whether the automated assistant has received a spoken utterance from one or more users. The spoken utterance can be from, for example, an elderly user and can include natural language content such as, "Assistant, have I missed any calls?"

In response to receiving the spoken utterance, the method 400 can proceed to an optional operation 404, which can include identifying a user profile corresponding to the user who provided the spoken utterance. For example, a user profile can be associated with a particular user and/or characterize certain preferences of the user. Alternatively, or additionally, a user profile can be associated with a type of person and/or can be based on certain common features of assistant interactions with the type of person. Such features and/or preferences can be used to determine a level of interaction for a particular user. For example, the user that provided the aforementioned spoken utterance can have a user profile that indicates certain features of the user that should be observed in order for the user to be considered as exhibiting a level of interaction that satisfies one or more interaction thresholds. Such features can include but are not limited to properties that are attributed to the user and/or properties that are attributed to a context of the user. For example, a user profile can indicate that certain voice characteristics are indicative of an increase in level of interaction when such voice characteristics are apparent after they were not apparent for a period of time. Alternatively, or additionally, a user profile can indicate that certain contextual characteristics, such as noise level and/or occupancy, are indicative of an increase or a decrease in a level of interaction when such contextual characteristics change over time.

The method 400 can proceed from the operation 402 or the operation 404 to an operation 406, which can include determining whether a level of interaction threshold has been satisfied. In some implementations, each respective user can have one or more corresponding levels of interaction thresholds. Alternatively, one or more users can share the respective level of interaction threshold. In this way, a user can be considered engaged with an automated assistant when a particular level of interaction threshold is satisfied. Alternatively, or additionally, a user can be associated with multiple levels of interaction thresholds, wherein each level of interaction threshold corresponds to a different degree of interaction. Therefore, when, for example, a first level of interaction threshold is satisfied the automated assistant can render a responsive output that embodies one or more first features. Furthermore, when a second level of interaction threshold is satisfied, the automated assistant can render a responsive output that embodies one or more second features that can include one or more features that are different from the one or more first features.

When a level of interaction threshold has been satisfied at the operation 406, the method can proceed to an operation 408, which can include generating related response data based on the spoken utterance and/or the interaction threshold. In some implementations, the related response and data can be generated according to one or more features associated with the interaction threshold that has been satisfied. For example, the related response data can include content that is different from other content that is responsive to a query embodied in the spoken utterance received at the operation 402. For example, when the spoken utterance is received, the automated assistant can identify a set of information in one or more documents, or other portions of content, and generate a responsive output using the set of information. However, when a level of interaction of the user satisfies a level of interaction threshold, the automated assistant can additionally identify a different set of information in the one or more documents, and/or in one or more other documents. This additional information can be responsive to one or more other queries that the user did not include in the spoken utterance, but that may be associated with the spoken utterance. Furthermore, this additional information can be used to generate related response data.

The method 400 can proceed from the operation 408 to an operation 410. Alternatively, when the level of interaction threshold is not satisfied, the method 400 can proceed from the operation 406 to the operation 410. The operation 410 can include generating responsive output data, and/or other automated assistant output data, that is based on the spoken utterance and, optionally, the related data. In other words, the responsive output data can characterize a response to one or more queries embodied in the spoken utterance, as well as the information identified by the automated assistant based on the interaction threshold being satisfied.

The method 400 can proceed from the operation 410 to an operation 412, which can include causing the automated assistant to render a responsive output based on the responsive output data (e.g., first responsive output data, second responsive output data, etc.). For example, in response to the user providing the spoken utterance, the automated assistant can render a responsive output such as, "You have two missed calls from your brother." This responsive output can be provided with, or without, the level of interaction threshold being satisfied. However, when the level of interaction threshold is satisfied, the responsive output can include additional natural language content such as, "Also, here is a voicemail that your brother left you: 'Hey, I'll stop by for dinner tonight. See you soon.'" In this way, predicted queries from the user can be fulfilled without the automated assistant having to explicitly receive a request to fulfill such predicted queries.

The method 400 proceeds from the operation 412 to an operation 416, which can include determining whether the level of interaction threshold remains satisfied after the responsive output from the automated assistant. For example, when the automated assistant provides, and/or is providing, the responsive output, "You have two missed calls from your brother. Also, here is a voicemail that your brother left you: 'Hey, I'll stop by for dinner tonight. See you soon.'", the automated assistant can determine the level of interaction of the user and/or a change in the level of interaction of the user. When the automated assistant determines that the level of interaction threshold remains satisfied, the method 400 can proceed from the operation 416 to an operation 414. Alternatively, when the level of interaction threshold is no longer satisfied, the method 400 can proceed from the operation 416 to the operation 402 of determining whether another spoken utterance or other input has been received.

In some implementations, when the level of interaction of the user changes during a portion of an automated assistant output, the automated assistant can identify the portion of the automated assistant output corresponding to the change in the level of interaction of the user. Depending on a degree of change in the level of interaction, the automated assistant can provide supplemental information that is based on content included in the portion of the automated assistant output. For example, a gaze of the user can change and become directed toward the automated assistant device when the automated assistant is rendering the portion of the responsive output that includes the voicemail quote: "See you soon." The automated assistant can determine that other queries related to a message that includes "see you soon" are typically related to requests for directions or transit time to a sender of the message. Therefore, because the automated assistant detected a positive change in the level of interaction of the user at that portion of the responsive output, the automated assistant can identify additional content that is responsive to queries related to directions and/or transit time to a home of the "brother." For example, in response to this positive change in the level of interaction, the automated assistant can render a supplemental output such as, "Traffic along the route to your brother's house is as usual, and the drive will take about 27 minutes."

In some implementations, the operation 414 can be an optional operation that includes identifying one or more user characteristics and/or contextual characteristics contributing to the level of interaction. For example, a proximity of the user to an automated assistant enabled device can be indicative of a level of interaction for the user. Alternatively, or additionally, a direction of a gaze of the user relative to an automated assistant device can influence a level of interaction of a user. Alternatively, or additionally, a speech characteristic, such as a cadence, of the user can indicate a level of interaction for the user with respect to the automated assistant. For example, a rise or fall in pitch of the user when providing a spoken utterance can indicate a correlated rise or a fall of the level of interaction of the user. When the automated assistant has identified one more user characteristics and/or contextual characteristics contributing to the level of interaction, the method 400 can proceed to the operation 408, which can include generating related response data based on the identified one or more user characteristics and/or the identified one or more contextual characteristics. When a proximity of the user changes and indicates an increase in the level of interaction, and/or when the proximity of the user is the greatest contributor to the level of interaction, the response can be generated to include graphical content. In this way, the automated assistant can provide a responsive output according to factors that most contribute to the level of interaction of the user.

In some implementations, when a cadence of speech of the user changes to indicate an increase in level of interaction with the automated assistant, additional response related data can be generated to leverage this particular characteristic contributing to the level of interaction. For example, when a cadence of the speech of the user exhibits a faster rhythm overtime and/or a change in pitch over time, an audible responsive output of the automated assistant can be rendered to also include a faster rhythm than a previous automated assistant output, and/or a change in pitch relative to a previous output of the automated assistant. For example, when the level of interaction threshold remains satisfied after the responsive output, the automated assistant can determine that an amount of time between words spoken by the user has decreased, and therefore indicates an increase in level of interaction of the user. In response, the automated assistant can generate related response data characterizing a natural language output with less time between the words that are embodied in the natural language output. For example, the natural language output can be, "Would you like to send your brother a response saying, 'Sounds good'?", which can be another responsive output that can satisfy a follow-up query that the user may provide after the previous responsive output provided by the automated assistant. This additional natural language output can have less empty audio time between audible words, at least relative to one or more previous responsive outputs provided by the automated assistant.

Figure 5:
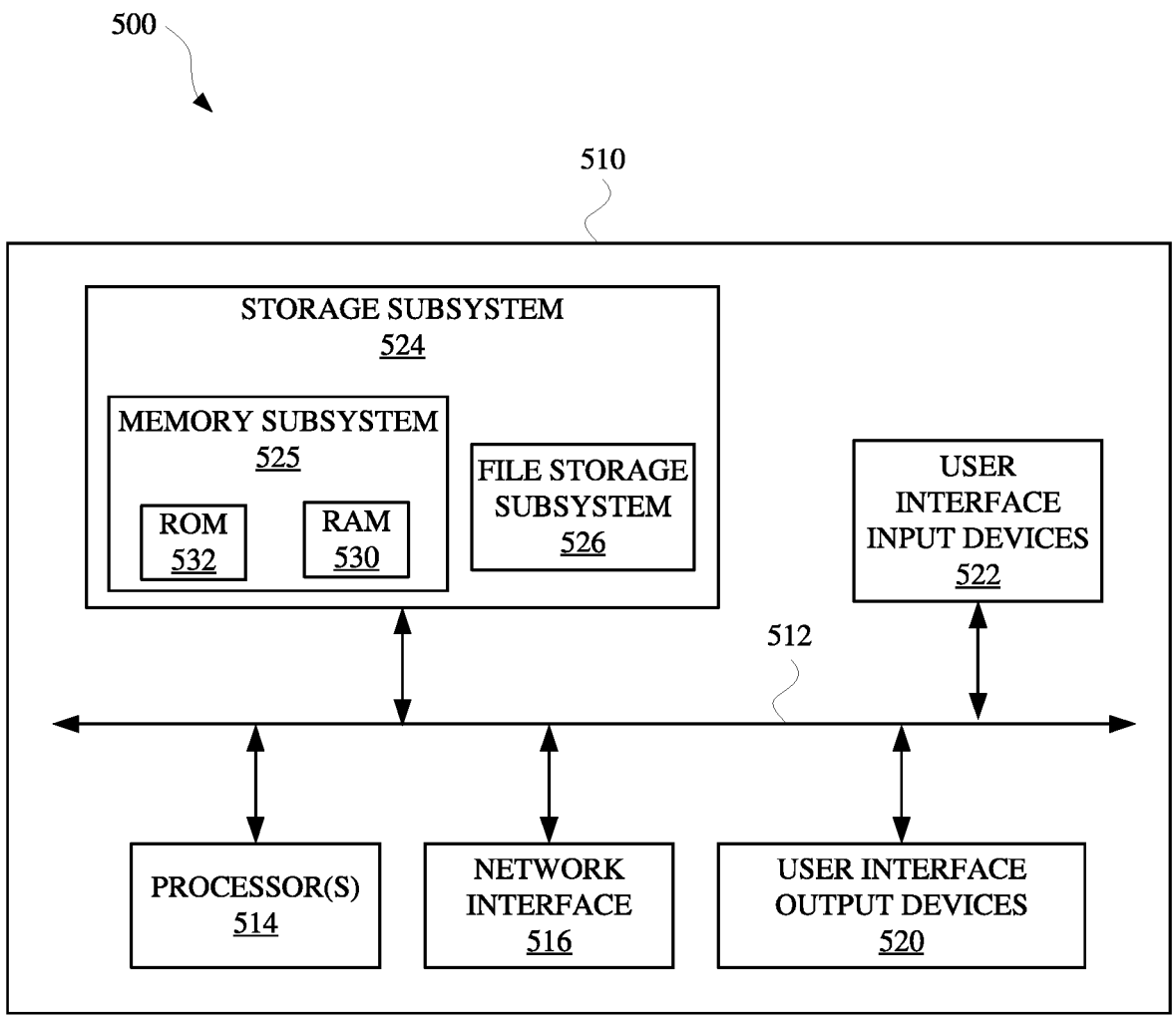
FIG. 5 is a block diagram of an example computer system.

FIG. 5 is a block diagram 500 of an example computer system 510. Computer system 510 typically includes at least one processor 514 which communicates with a number of peripheral devices via bus subsystem 512. These peripheral devices may include a storage subsystem 524, including, for example, a memory 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 400, and/or to implement one or more of system 300, automated assistant device 104, automated assistant device 124, wearable device 204, assistant device 222, and/or any other application, device, apparatus, and/or module discussed herein.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as determining, by a computing device, that a user has provided a spoken utterance to an automated assistant that is accessible via the computing device. The operations can further include determining a first level of interaction of the user at one or more instances of time occurring before, during, or after the user provided the spoken utterance to the automated assistant, wherein the first level of interaction is a metric that characterizes an estimated amount of attention the user is providing to the automated assistant at the one or more instances of time. The operations can further include determining whether the first level of interaction satisfies an interaction threshold, and when the first level of interaction satisfies the interaction threshold: generating, based on the first level of interaction, assistant response data, wherein the assistant response data includes content that is responsive to one or more additional queries that are associated with a first user query embodied in the spoken utterance. The operations can further include generating, based on the first level of interaction and the assistant response data, first responsive output data, wherein the first responsive output characterizes a first responsive output that is responsive to the first user query and the one or more additional queries. The operations can further include causing the automated assistant to render the first responsive output to the user; and subsequent to the automated assistant rendering the first responsive output: determining a second level of interaction for the user. The operations can further include determining whether the second level of interaction satisfies the interaction threshold. The operations can further include, when the second level of interaction satisfies the interaction threshold: generating, based on the second level of interaction, additional assistant response data, wherein the additional assistant response data identifies one or more other additional queries that are associated with the first query. The operations can further include generating, based on the second level of interaction and the additional assistant response data, second responsive output data, wherein the second responsive output data characterizes a second responsive output that is responsive to the one or more other additional queries and is different than the first responsive output. The operations can further include causing the automated assistant to render the second responsive output to the user.

In some implementations, the second responsive output is provided by the automated assistant without the user providing another spoken utterance that is subsequent to the first responsive output being rendered but is prior to the second responsive output being rendered. In some implementations, generating the first responsive output data includes: selecting one or more features of the first responsive output based on the first level of interaction.

In some implementations, a particular feature of the one or more features corresponds to a total amount of time for rendering the first responsive output, and selecting the one or more features of the first responsive output includes: selecting the total amount of time based on the first level of interaction. In some implementations, a particular feature of the one or more features corresponds to a graphical interface element to be included with the first responsive output, and selecting the one or more features of the first responsive output includes: selecting the graphical interface element based on the first level of interaction.

In some implementations, determining the first level of interaction of the user includes: identifying one or more vocal characteristics exhibited by the user when the user provided the spoken utterance. In some implementations, determining the first level of interaction of the user includes: processing contextual data that is based on output from one or more sensors before the user provided the spoken utterance to the automated assistant. In some implementations, determining the first level of interaction of the user includes: identifying, in response to the spoken utterance from the user, a user profile corresponding to the user, wherein processing the contextual data is performed according to the user profile, which is different from another user profile that is accessible to the automated assistant.

In some implementations, determining the first level of interaction of the user further includes: selecting, based on the user profile corresponding to the user, a trained machine learning model from one or more trained machine learning model that are associated with different users of the automated assistant, wherein processing the contextual data is performed using the trained machine learning model. In some implementations, determining the first level of interaction of the user further includes: determining whether a position of the user relative to the computing device contributes to the first level of interaction of the user. In some implementations, generating the first responsive output data includes selecting a portion of content from a corpus of content that is accessible to the automated assistant, wherein generating the second responsive output data includes selecting a different portion of the content from the corpus of content, and wherein the corpus of content includes one or more documents that are accessible to the automated assistant.

In other implementations, a method implemented by one or more processors is set forth as including operations such as providing, via a computing device, an automated assistant output to a user, wherein the automated assistant output is rendered at one or more interfaces of the computing device. The method can further include an operation of determining, while an automated assistant is providing the automated assistant output, that a change in a level of interaction of the user has occurred. The method can further include an operation of identifying, based on the change in the level of interaction of the user, a portion of the automated assistant output that was being rendered when the change in the level of interaction occurred. The method can further include an operation of generating, based on the portion of the automated assistant output, additional content that is associated with the portion of the automated assistant output that was being rendered when the change in the level of interaction occurred, wherein the additional content is different than the automated assistant output. The method can further include an operation of causing, based on the change in the level of interaction, the automated assistant to render an additional automated assistant output that embodies the additional content.

In some implementations, the automated assistant output is based on a first document, and the additional content is selected from a second document that is different from the first document. In some implementations, the automated assistant output is responsive to a first query, and the additional content is responsive to a second query that is different from the first query and was not previously provided by the user to the automated assistant. In some implementations, providing the automated assistant output to the user includes rendering the automated assistant output in response to the user providing the first query to the automated assistant while the user is exhibiting one or more user characteristics; and wherein determining that the change in the level of interaction of the user has occurred includes determining that the one or more user characteristics changed in response to the automated assistant providing the portion of the automated assistant output. In some implementations, generating the additional content includes: selecting one or more features of the additional content based on the change in the level of interaction, wherein the automated assistant renders the additional automated assistant output as an audio output or a video output that embodies the one or more features.

In yet other implementations, a method implemented by one or more processors is set forth as including operations such as determining, by a computing device, a first level of interaction of a user at one or more instances of time, wherein the first level of interaction is a metric that characterizes an estimated amount of attention the user is providing to an automated assistant at the one or more instances of time, and wherein the computing device provides access to the automated assistant. The method can further include an operation of generating, based on the first level of interaction, automated assistant output data, wherein the automated assistant output data includes content that is responsive to one or more queries that are associated with the user or a context of the user. The method can further include an operation of causing, using the automated assistant output data, the automated assistant to render a first responsive output to the user. The method can further include an operation of, subsequent to the automated assistant rendering the first responsive output: determining a second level of interaction for the user. The method can further include an operation of generating, based on the second level of interaction, additional automated assistant output data, wherein the additional automated assistant output data includes other content that is responsive to one or more other additional queries that are different than the one or more queries. The operation can further include an operation of causing, based on the second level of interaction and the additional automated assistant output data, the automated assistant to render a second responsive output to the user, wherein the second responsive output is different than the first responsive output.

In some implementations, the method can further include an operation of, subsequent to the automated assistant rendering the first responsive output: receiving a spoken utterance from the user, wherein the spoken utterance is embodied in audio data that is accessible to the automated assistant; wherein the second responsive output is responsive to the spoken utterance, and wherein generating the additional automated assistant output data includes: selecting, based on the second level of interaction, a voice filter for filtering audio that is different from a voice of the user, and processing the audio data using the voice filter. In some implementations, the method can further include an operation of, subsequent to the automated assistant rendering the first responsive output: receiving a spoken utterance from the user, wherein the spoken utterance is embodied in audio data that is accessible to the automated assistant; wherein the second responsive output is responsive to the spoken utterance, and wherein generating the additional automated assistant output data includes: processing, based on the second level of interaction, the audio data using an automatic speech recognition (ASR) process that is biased towards speech of the user. In some implementations, the second responsive output is provided by the automated assistant without the user providing a spoken utterance that is subsequent to the first responsive output being rendered but is prior to the second responsive output being rendered.

In yet other implementations, a method implemented by one or more processors is set forth and includes: receiving, via one or more microphones of a client device, a user utterance; determining temporal proximity of the user utterance to a preceding utterance that was received at the client device and that immediately preceded the user utterance; determining, based on the temporal proximity, a level of interaction of the user for the user utterance; generating a response to the user utterance based on the level of interaction; and causing the response to be rendered at the client device. Generating the response to the user utterance can optionally include determining, based on the level of interaction, a quantity of content to include in the response.

In some of those implementations, determining the temporal proximity of the user utterance to a preceding utterance can include determining a timestamp for the preceding utterance, an additional timestamp for the utterance, and determining the temporal proximity based on comparing the timestamp and the additional timestamp. In some versions of those implementations, determining the temporal proximity comprises determining a difference between the timestamp and the additional timestamp, and subtracting, from the difference, a duration of a preceding response to the preceding utterance. In some of those versions, the preceding timestamp corresponds to a determined endpoint of the preceding utterance and the additional timestamp corresponds to a start of the user utterance.

In some of those implementations, determining the level of interaction is further based on an additional temporal proximity of the preceding utterance to an additional preceding utterance that was received at the client device and that immediately preceded the preceding utterance.

In some of those implementations, determining, based on the level of interaction, the quantity of content to include in the response comprises determining, based on the level of interaction, whether to include, in the response: only a given snippet from a resource, or the given snippet and an additional snippet from the resource.

In some of those implementations, determining, based on the level of interaction, the quantity of content to include in the response comprises determining, based on the level of interaction, whether to include, in the response: only content from a first resource, or the content from the first resource and content from an additional resource.

In yet other implementations, a method implemented by one or more processors is set forth and includes: receiving, via one or more microphones of a client device, a user utterance; determining a user profile for the user utterance; generating a first response to the user utterance; and causing the first response to be rendered at the client device; receiving, via the one or more microphones of the client device, an additional user utterance; determining temporal proximity of the additional user utterance to the user utterance; and in response to the temporal proximity satisfying a threshold, processing the additional user utterance using one or more features of the user profile.

In some versions of those implementations, the one or more features of the user profile include one or more terms and processing the additional user utterance using the one or more features comprises biasing speech recognition of the additional user utterance toward the one or more terms. In some additional or alternative versions of those implementations, the one or more features of the user profile include a speaker embedding and processing the additional user utterance using the one or more features comprises using the speaker embedding to isolate the additional user utterance from other utterance(s) and/or background noise.

In some versions of those implementations, determining the user profile for the user utterance comprises performing speaker recognition based on the user utterance, or a hotword that precedes the user utterance, and determining the user profile based on the speaker recognition. In some of those versions, the additional user utterance does not include, and is not immediately preceded by, a hotword.

We claim:

1. A method implemented by one or more processors, the method comprising:
   determining that a user has provided a user input directed to an automated assistant via a client device of the user;
   determining a first level of interaction of a user at one or more instances of time;
   generating, based on the first level of interaction, automated assistant output data that includes content that is responsive to the user input and that is also responsive to one or more queries that are associated with a context of the user at the one or more instances of time,
      wherein the context of the user at the one or more instances of time is determined based on a physical activity being performed by the user, in an environment of the user, at the one or more instances of time,
      wherein the physical activity being performed by the user, in the environment of the user, at the one or more instances of time is determined based on sensor data generated by the client device or an additional client device of the user that is in addition to the client device, and
      wherein the one or more queries that are associated with the context of the user at the one or more instances of time are determined based on the physical activity being performed by the user, in the environment of the user, at the one or more instances of time;
   causing, based on the automated assistant output data, the automated assistant to render a first responsive output for presentation to the user via the client device; and
   subsequent to the automated assistant rendering the first responsive output:
      determining that the user has provided an additional user input directed to the automated assistant via the client device or the additional client device of the user;
      determining a second level of interaction for the user at one or more subsequent instances of time that are subsequent to the one or more instances of time;
      generating, based on the second level of interaction, additional automated assistant output data that includes other content that is responsive to the additional user input but is not responsive to any queries associated with a subsequent context of the user at the one or more subsequent instances of time,
         wherein the subsequent context of the user at the one or more subsequent instances of time is determined based on a subsequent physical activity being performed by the user, in an environment of the user, at the one or more subsequent instances of time,
         wherein the subsequent physical activity being performed by the user, in the environment of the user, at the one or more subsequent instances of time is determined based on subsequent sensor data generated by the client device or the additional client device, and
         wherein no queries are associated with the subsequent context of the user at the one or more subsequent instances of time based on the subsequent physical activity being performed by the user, in the environment of the user, at the one or more subsequent instances of time; and
      causing, based on the additional automated assistant output data, the automated assistant to render a second responsive output for presentation to the user via the client device or the additional client device, wherein the second responsive output is different from the first responsive output.

2. The method of claim 1, wherein the first level of interaction is a metric that characterizes an estimated amount of attention the user is providing to the automated assistant at the one or more instances of time.

3. The method of 2, wherein the second level of interaction is an additional metric that characterizes the estimated amount of attention the user is providing to the automated assistant at the one or more subsequent instances of time.

4. The method of claim 1, wherein the user input is an instance of a spoken utterance directed to the automated assistant, and wherein the additional user input is an additional instance of the spoken utterance directed to the automated assistant.

5. The method of 4, wherein generating the additional automated assistant output data includes:
   selecting, based on the second level of interaction, a voice filter for filtering audio that is different from a voice of the user, and
   processing the audio data using the voice filter.

6. The method of 4, wherein generating the additional automated assistant output data includes:
   processing, based on the second level of interaction, the audio data using an automatic speech recognition (ASR) process that is biased towards speech of the user.

7. The method of claim 1, wherein the user input is an instance of typed input or touch input directed to the automated assistant, and wherein the additional user input is an additional instance of typed input or touch input directed to the automated assistant.

8. The method of claim 1, wherein the additional user input is directed to the automated assistant via the additional client device.

9. The method of claim 1, wherein the other content that is responsive to the additional user input is also responsive to one or more additional queries that are associated with an additional context of the user at the one or more subsequent instances of time.

10. The method of claim 9, wherein the additional context of the user at the one or more subsequent instances of time includes one or more additional environmental features of an additional environment of the user and/or one or more additional user features of the user, wherein the one or more additional environmental features of the additional environment of the user and/or the one or more user features of the user are determined based on additional sensor data generated by the one or more sensors of the client device and/or the one or more additional sensors of the additional client device, wherein the one or more additional queries that are associated with the additional context of the user at the one or more subsequent instances of time are generated based on the one or more additional environmental features of the environment of the user and/or the one or more additional user features of the user, and wherein the one or more additional queries differ from the one or more queries.

11. A method implemented by one or more processors, the method comprising:
  determining that a user has provided a user input directed to an automated assistant via a client device of the user;
  causing an automated assistant output that is responsive to the user input to be provided for presentation to the user,
    wherein the automated assistant output is rendered for presentation to the user at one or more interfaces of the client device;
  detecting a gaze of the user that is directed to the automated assistant output and while the automated assistant is providing the automated assistant output for presentation to the user;
  determining, based on detecting the gaze of the user that is directed to the automated assistant and while the automated assistant is providing the automated assistant output for presentation to the user, that a change in a level of interaction of the user has occurred; and
  in response to determining that the change in the level of interaction of the user has occurred and without the user having provided an additional user input directed to the automated assistant:
    identifying, based on detecting the gaze of the user that is directed to the automated assistant and while the automated assistant is providing the automated assistant output for presentation to the user, a portion of the automated assistant output that was being actively rendered when the gaze of the user is directed to the automated assistant;
    generating, based on the portion of the automated assistant output that was being actively rendered when the gaze of the user is directed to the automated assistant, additional content that is associated with the portion of the automated assistant output that was being actively rendered when the change in the level of interaction occurred; and
    causing, based on the additional content, an additional automated assistant output to be provided for presentation to the user,
      wherein the additional automated assistant output is rendered for presentation to the user at one or more of the interfaces of the client device or one or more additional interfaces of an additional client device of the user, and
      wherein the additional automated assistant output is different from the automated assistant output.

12. The method of claim 11, wherein the automated assistant output is based on a first document, and the additional content is selected from a second document that is different from the first document.

13. The method of claim 11, wherein the automated assistant output is responsive to a first query that was included in the user input, and wherein the additional content is responsive to a second query that is different from the first query and that was not previously provided by the user to the automated assistant.

14. The method of claim 11,
  wherein providing the automated assistant output to the user includes rendering the automated assistant output in response to the user providing the first query to the automated assistant while the user is exhibiting one or more user characteristics; and
  wherein determining that the change in the level of interaction of the user has occurred includes determining that the one or more user characteristics changed in response to the automated assistant providing the portion of the automated assistant output.

15. The method of claim 11, wherein generating the additional content includes selecting one or more features of the additional content based on the change in the level of interaction, and wherein the automated assistant renders the additional automated assistant output as an audio output or a video output that embodies the one or more features.

16. The method of claim 11, further comprising:
  in response to determining that no change in the level of interaction of the user has occurred and without the user having provided the additional user input directed to the automated assistant:
    refraining from generating the additional content.

17. The method of claim 11, wherein the additional user input is directed to the automated assistant via the additional client device.

18. A system comprising:
  at least one processor; and
  memory storing instructions that, when executed, cause the at least one processor to:
    determine that a user has provided a user input directed to an automated assistant via a client device of the user;
    determine a first level of interaction of a user at one or more instances of time;
    generate, based on the first level of interaction, automated assistant output data that includes content that is responsive to the user input and that is also responsive to one or more queries that are associated with a context of the user at the one or more instances of time,
      wherein the context of the user at the one or more instances of time is determined based on a physical activity being performed by the user, in an environment of the user, at the one or more instances of time,
      wherein the physical activity being performed by the user, in the environment of the user, at the one or more instances of time is determined based on sensor data generated by the client device or an additional client device of the user that is in addition to the client device, and
      wherein the one or more queries that are associated with the context of the user at the one or more instances of time are determined based on the physical activity being performed by the user, in the environment of the user, at the one or more instances of time;

cause, based on the automated assistant output data, the automated assistant to render a first responsive output for presentation to the user via the client device; and subsequent to the automated assistant rendering the first responsive output:

determine that the user has provided an additional user input directed to the automated assistant via the client device or the additional client device of the user that is in addition to the client device;

determine a second level of interaction for the user at one or more subsequent instances of time that are subsequent to the one or more instances of time;

generate, based on the second level of interaction, additional automated assistant output data that includes other content that is responsive to the additional instance of the user input but is not responsive to any queries associated with a subsequent context of the user at the one or more subsequent instances of time, wherein the subsequent context of the user at the one or more subsequent instances of time is determined based on a subsequent physical activity being performed by the user, in an environment of the user, at the one or more subsequent instances of time, wherein the subsequent physical activity being performed by the user, in the environment of the user, at the one or more subsequent instances of time is determined based on subsequent sensor data generated by the client device or the additional client device, and wherein no queries are associated with the subsequent context of the user at the one or more subsequent instances of time based on the subsequent physical activity being performed by the user, in the environment of the user, at the one or more subsequent instances of time; and cause, based on the additional automated assistant output data, the automated assistant to render a second responsive output for presentation to the user via the client device or the additional client device, wherein the second responsive output is different than the first responsive output.

* * * * *